(12) United States Patent
Parmar et al.

(10) Patent No.: US 11,560,075 B2
(45) Date of Patent: *Jan. 24, 2023

(54) ISOFIX INTERFACE STRUCTURE OF VEHICLE SEAT

(71) Applicant: Volvo Car Corporation, Gothenburg (SE)

(72) Inventors: Vishal Parmar, Gothenburg (SE); Lars Modh, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,412

(22) Filed: Jun. 28, 2021

(65) Prior Publication Data

US 2021/0323452 A1    Oct. 21, 2021

Related U.S. Application Data

(63) Continuation of application No. 16/738,003, filed on Jan. 9, 2020, now Pat. No. 11,046,216.

(60) Provisional application No. 62/791,161, filed on Jan. 11, 2019.

(51) Int. Cl.
*B60N 2/28* (2006.01)

(52) U.S. Cl.
CPC .................. *B60N 2/2893* (2013.01)

(58) Field of Classification Search
CPC .... B60N 2/2893; B60N 2/2887; B60N 2/289; B60N 2/28; B60N 2/26
USPC ....................................................... 297/253
See application file for complete search history.

(56) References Cited

U.S. PATENT DOCUMENTS

| | | | |
|---|---|---|---|
| 10,189,382 B2 * | 1/2019 | Sammons | B60N 2/2887 |
| 11,046,216 B2 * | 6/2021 | Parmar | B60N 2/6009 |
| 2007/0284924 A1 | 12/2007 | Gold et al. | |

FOREIGN PATENT DOCUMENTS

| | | |
|---|---|---|
| CN | 204749907 U | 11/2015 |
| CN | 108177567 A | 6/2018 |
| CN | 108189719 A | 6/2018 |
| CN | 207826054 U | 9/2018 |

* cited by examiner

*Primary Examiner* — Mark R Wendell
(74) *Attorney, Agent, or Firm* — Clements Bernard Walker; Christopher L. Bernard

(57) ABSTRACT

The present invention provides an ISOFIX interface structure of a vehicle seat. The ISOFIX interface structure of the vehicle seat comprises a shroud mounting base and two ISOFIX shrouds. Two mounting holes are formed in the shroud mounting base, and the mounting holes are penetrated from front to rear. The two ISOFIX shrouds can correspondingly be inserted into the corresponding mounting holes and can be detachably mounted on the shroud mounting base. According to the ISOFIX interface structure of the vehicle seat, the structure is novel, neat, attractive, and easy to realize. The problem is that conventional ISOFIX interfaces collapse surrounding seat foam when being installed. Here, consistency of the two ISOFIX interfaces on the same vehicle seat is guaranteed, the subsequent installation of a child safety seat is convenient, and the assembly and disassembly efficiency of the child safety seat can be effectively improved.

20 Claims, 9 Drawing Sheets

ISOFIX INTERFACE STRUCTURE OF VEHICLE SEAT

CROSS-REFERENCE TO RELATED APPLICATION

The present disclosure is a continuation (CON) of co-pending U.S. patent application Ser. No. 16/738,003, filed on Jan. 9, 2020, and entitled "ISOFIX INTERFACE STRUCTURE OF VEHICLE SEAT," which claims the benefit of priority of U.S. Provisional Patent Application No. 62/791,161, filed on Jan. 11, 2019, and entitled "ISOFIX INTERFACE STRUCTURE OF VEHICLE SEAT," the contents of both of which are incorporated in full by reference herein.

TECHNICAL FIELD

The present invention belongs to the technical field of vehicle seat members, particularly to an ISOFIX interface structure of a vehicle seat.

BACKGROUND

An ISOFIX (International Standards Organization FIX) interface is an interface used in vehicles in many countries to securely receive and retain a child safety seat. With the increasing popularity of laws and regulations that enhance safety, all vehicles in these countries are now designed with vehicle seats that provide convenient child safety seat interfaces, thus ISOFIX interfaces are installed, providing a rigid, safe connection between vehicle seat and child safety seat. Most vehicle manufacturers choose to use such ISOFIX interfaces in all vehicles and seek enhanced designs.

Currently, two independent ISOFIX interfaces are typically mounted in each rear vehicle seat. To meet the comfort requirements of the people using the vehicle seat, vehicle seat cushions are commonly used to meet ergonomic design requirements. Such seat cushions are necessarily mounted at and around the ISOFIX interfaces, where a resulting force acts on the seat cushion foam unevenly, the pressure exerted by the surrounding sleeve surfaces of the ISOFIX interfaces causing undesirable wrinkles around the seat cushion foam in these regions. This affects the appearance of the vehicle seat and provides accumulation points for dirt and debris. Further, since the seat frame is generally subjected to greater tolerances than the seat cushion and ISOFIX interfaces are fixed to the seat frame, this can result in two ISOFIX interfaces on the same vehicle seat with symmetry differences, such that a child safety seat is difficult to install, often requiring two people to complete the installation. Solving these problems is a top priority.

SUMMARY

In order to solve the above technical problem, the present invention provides a seat foam that is not collapsed or subject to fouling by the associated ISOFIX interfaces, but that also ensures the structural integrity of the ISOFIX interfaces on the vehicle seat and ensures their symmetry.

To achieve the above objects, the technical solution of the present invention is as follows:

The ISOFIX interface structure for a vehicle seat includes: a base and a cover are coupled to form each ISOFIX interface, said cover having a mounting hole penetrating for each ISOFIX interface, with two ISOFIX caps inserted into the mounting holes respectively corresponding to each ISOFIX interface, each ISOFIX cap is detachably mounted on the cover.

With the above structure, the cover is fixed to the mounting seat mounted on the seat frame, and then both surfaces of the cover are covered with foam, so that the cover does not affect the seat foam structure via the outer surface of the sleeve. The cover covers the ISOFIX mount through the mounting hole in contact with the cover, thus it does not affect the surrounding surface of the seat foam via the sleeve during installation and removal. By avoiding the above two conventional interfaces, wrinkles around the ISOFIX interfaces are avoided, resulting in not only more beautiful vehicle seats, but vehicle seats that enhance the sense of quality, being more clean and tidy. In addition, since the two ISOFIX covers are fixed directly to the cover mount on opposite sides, consistency of the ISOFIX interfaces is provided, so that the child safety seat is easy to install.

Advantageously, the mount cover has two forwardly projecting protrusions, and the two mounting holes are located on the corresponding projecting portions. With the above structure, when the cover is mounted on the ISOFIX cover mounts, each projecting portion and the mounting holes can be completely covered with the ISOFIX cover. This more effectively prevents crushed seat foam and trim cover wrinkles.

Advantageously, the cover has a support mount connector portion, and the two projecting portions are disposed on end portions connected to the support and projecting forwardly are connected to the support portion. With this structure, the support connecting portion is thinner, the thick portion being the protruding design, so that the cover is mounted in the seat itself to ensure structural strength, while being as small as possible, and as lightweight as possible, to meet the design requirements for lightweight vehicles.

Advantageously, the cover mounting base has at least one viewing aperture. With this structure, the mounting of the cover to the seat frame connector is reliable, and this plays a role in weight loss.

Advantageously, the ISOFIX fitted cover includes a panel portion extending rearwardly from the panel portion and the inner portion, the insert portion of the mounting hole adapted to a front end of said mounting hole and having a panel portion adapted to a mounting portion. When the cover is mounted, the panel mounting portion includes a fitted sink portion, and the fitted portion is inserted into the mounting hole. When using this structure, the fitted hole of the ISOFIX mounting cover in the installed state can be more reliably supported on the base cover.

Advantageously, the outer end of the insert portion has at least one connector, said rear end having a mounting hole corresponding to a compatible bayonet connector. With this structure, the ISOFIX cover is detachably mounted on the cover mounting base, providing convenient operation, low cost, high connection reliability, and long service life.

Advantageously, the insert portion comprises at least two support portions that are plate-shaped portion and have elasticity, providing a gap between adjacent support portions. With this structure, the structure is simple, reliable, and easy to implement, so that the ISOFIX cap is detachably mounted on the cover mounting seat.

Advantageously, the central portion of the outer panel has reinforcing bosses projecting outwardly. This further increases the structural strength of the ISOFIX cover, extending the life of the ISOFIX cover.

Advantageously, the inside of the cover mount has a lip along an outer periphery thereof. This further improves the reliability of the seat frame and the seat mounting, providing for easy installation and operation.

Advantageously, the inside of the cover mount has at least one support seat cooperating with the engaging structure. This further improves the reliability of the seat frame and the seat mounting to which it is connected.

Compared with the prior art, the beneficial effects of the present invention are:

The present invention provides a vehicle seat ISOFIX interface structure that is easy to implement, solves the problem of pressure around the seat foam and seat foam collapse when the ISOFIX mounting interface is engaged, is neat and beautiful, and ensures that, in the same vehicle seat, two ISOFIX interfaces are consistent, thus providing easy to install child safety seats, effectively improving the efficiency of a removable child safety seat.

DESCRIPTION OF EMBODIMENTS

The following examples and accompanying drawings further illustrate the present invention.

Figure 1:
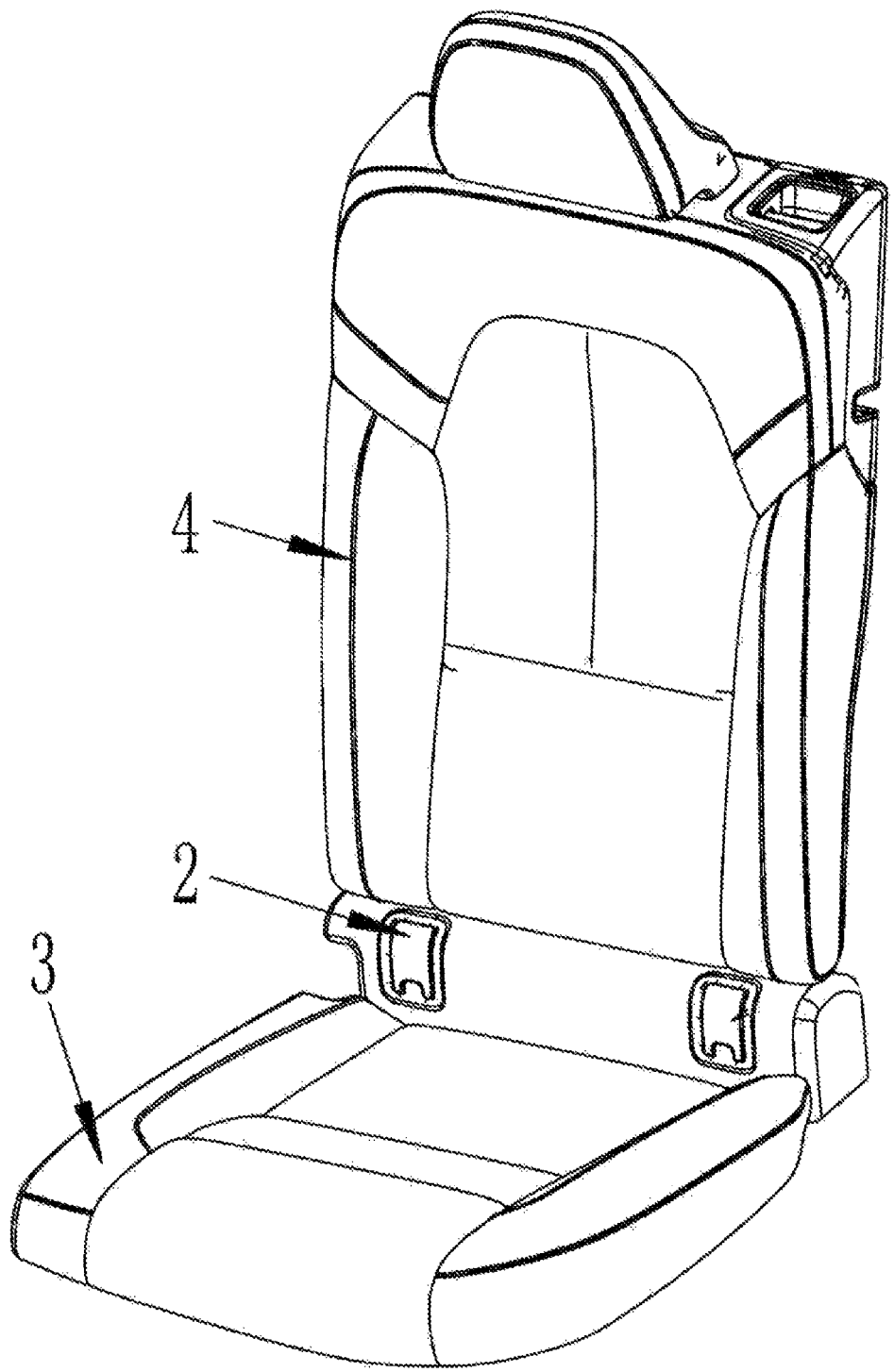
FIG. 1 is a schematic view of the present invention.
Figure 2:
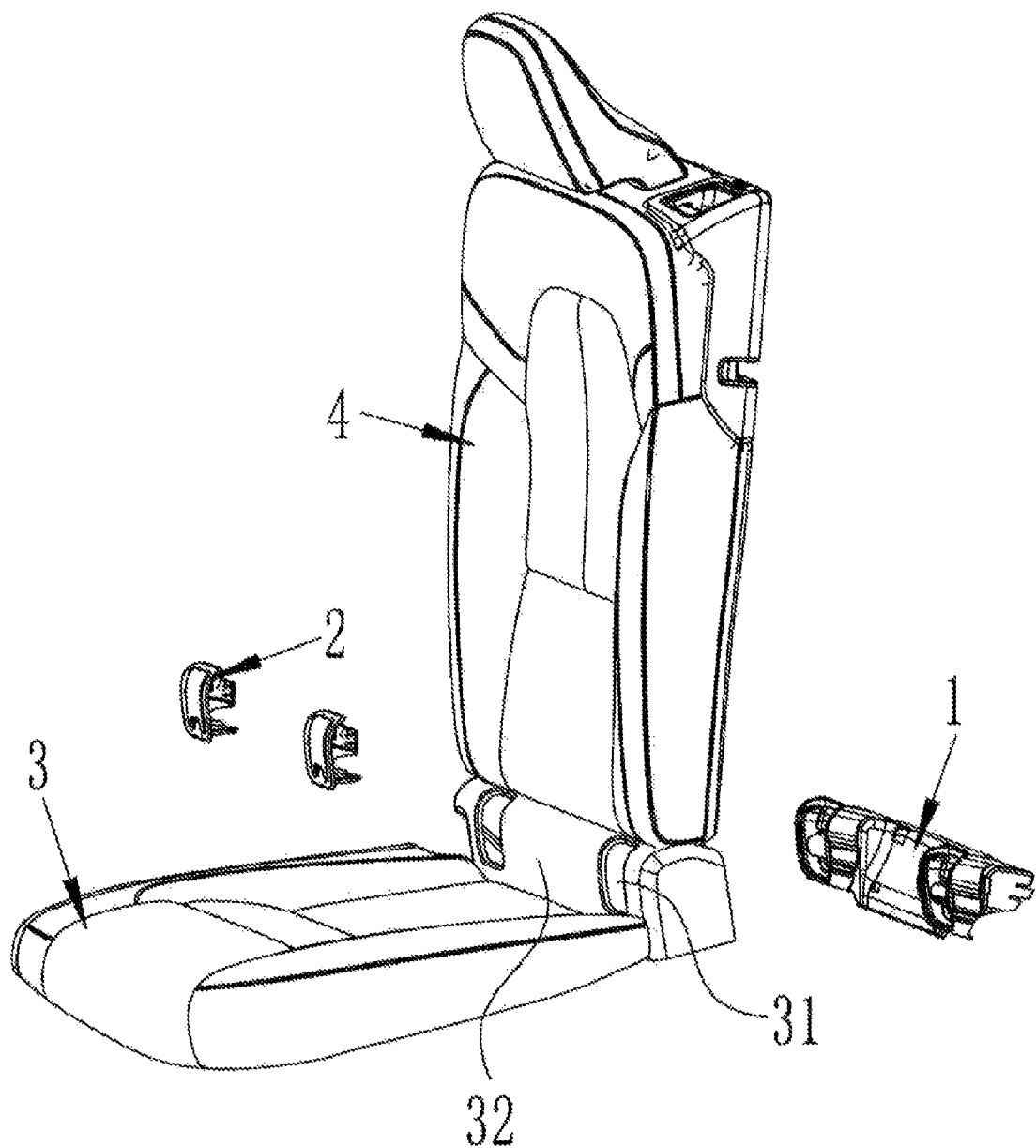
FIG. 2 is an exploded view of FIG. 1.

FIGS. 1 and 2 show an ISOFIX interface vehicle seat including a backrest 4 and a seat cushion 3, the seat cushion 3 forward in front of the rear portion and defining two ISOFIX mounting openings 31, the two ISOFIX mounting openings 31 arranged in a horizontal direction. The cover is provided with a mount 1 and two ISOFIX covers 2 on the inside of the seat cushion 3, which is coupled to a seat frame 33. The cover is mounted on the mount 1 and is fixed to the seat frame 33, and through the seat cushion 3 the ISOFIX cover 2 can be inserted respectively through the corresponding ISOFIX mounting opening 31, being detachably mounted on a cover mount.

Referring to FIGS. 1 and 2, the rear end of the seat cushion 3 of the seat 32, is against the connecting portion 32 and the seat cushion relative position of the connecting portion 3 is fixed to ensure reliable child safety seat installation 4 against the seat back relative to the connection portion 32 to accommodate the needs of passengers. The distribution of the two ISOFIX mounting openings of the seat 31 is in the horizontal direction against the front connecting portion 32 of the cover against the mount portion 32 of the internal connection.

Figure 3:
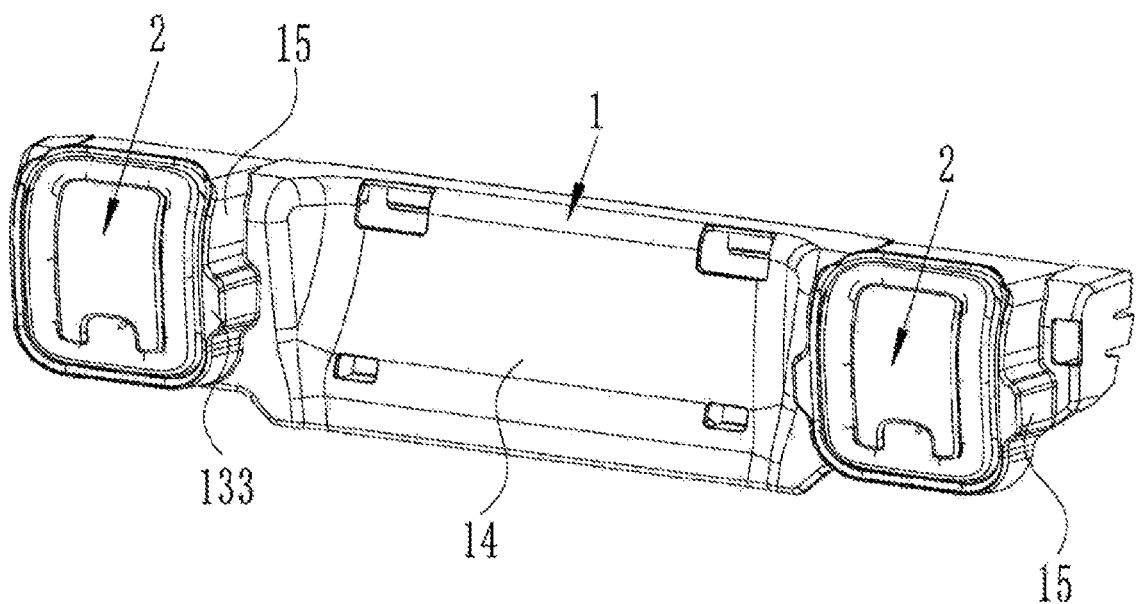
FIG. 3 a perspective schematic structural diagram of the present invention.
Figure 4:
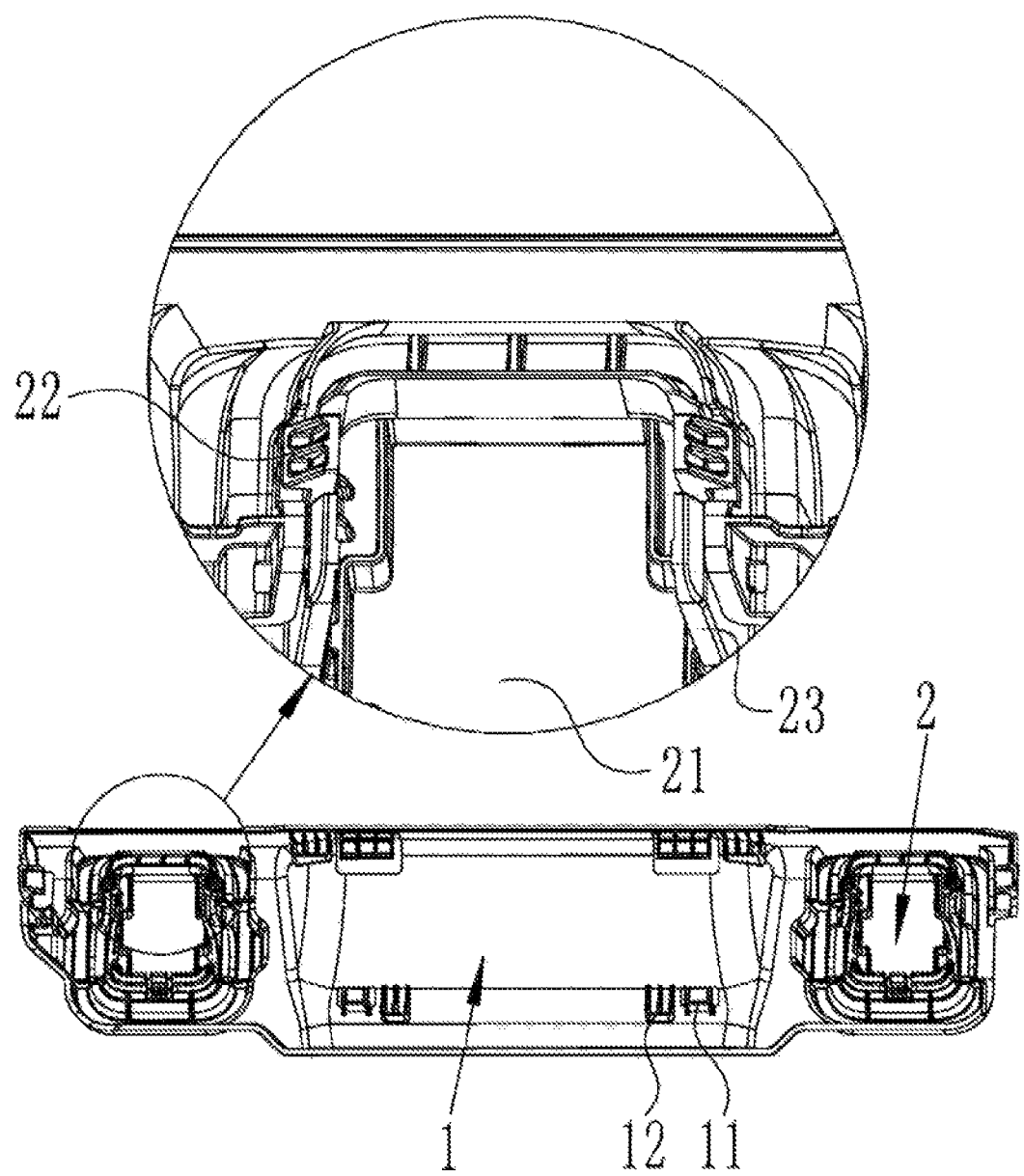
FIG. 4 is a schematic perspective view of another configuration of the present invention.

Referring to FIGS. 3 and 4, the vehicle seat ISOFIX interface structure includes a cap and two ISOFIX mount covers 2, said cap or cover having two longitudinal through-mounts is mounted in the lid hole 13, and the two ISOFIX covers 2 are respectively inserted into the corresponding mounting holes 13, and the cover is detachably mounted on the mount.

Referring to FIGS. 3-6, said cover forms a mount, made of a plastic material, and can effectively improve retention strength, is lightweight, and meets design requirements. Specifically, the cap or mount includes a support mount connecting portion 14, which support both of the connection portions 14, which have projecting portions 15 that are projected forward to support the connection portion 14, so that two projecting portions 15 are fitted in corresponding ISOFIX mounting structure, while the support portion 14 is connected to the projecting portion and mounts the cover 1 to ensure structural strength while being as small as possible, as lightweight as possible, and meets the requirements of automotive design. The projecting portion 15 has front and rear mounting holes 13 therethrough, while the mounting hole 13 on the connection structure has two ISOFIX pieces cooperating with the cover, so that the covers are detachably mounted on the cover cap mount 1. This avoids the appearance of folds and wrinkles around the interfaces, not only providing more beautiful vehicle seats, but enhancing the sense of quality, and making things more clean and tidy.

It should be noted that the ISOFIX cover 2 has a variety of ways to mount the cover 1, which is detachably connected. Referring to FIGS. 3-7, in a preferred embodiment, the connecting structure utilizes a plurality of bayonets 131, each bayonet 131 is distributed on the outer periphery of the mounting hole 13 the rear end. The ISOFIX cover 2 has a respective vehicle connector 22 adapted to each bayonet 131, when inserted into the mounting hole 13 of the ISOFIX cover 2, corresponding to the respective vehicle connector 22 with the bayonet 131 being snap fit.

Figure 5:
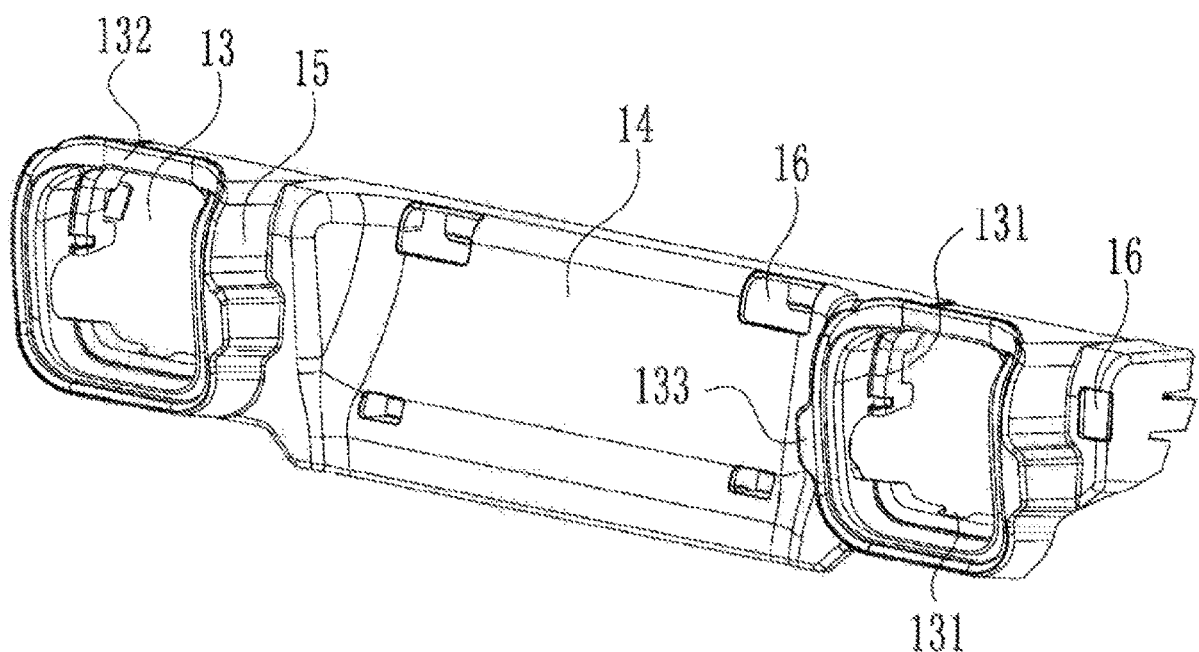
FIG. 5 is a perspective schematic view of the mount structure.

Referring to FIGS. 3 and 5, the front end of the mounting hole 13 has an annular mounting stage sink 132. In the front end face of the projection portion 15 is provided at least one groove 133, although the present embodiment is preferably provided with two grooves 133, where two grooves 133 are positioned in a corresponding way to allow installation of the left and right sink units 132.

Figure 6:
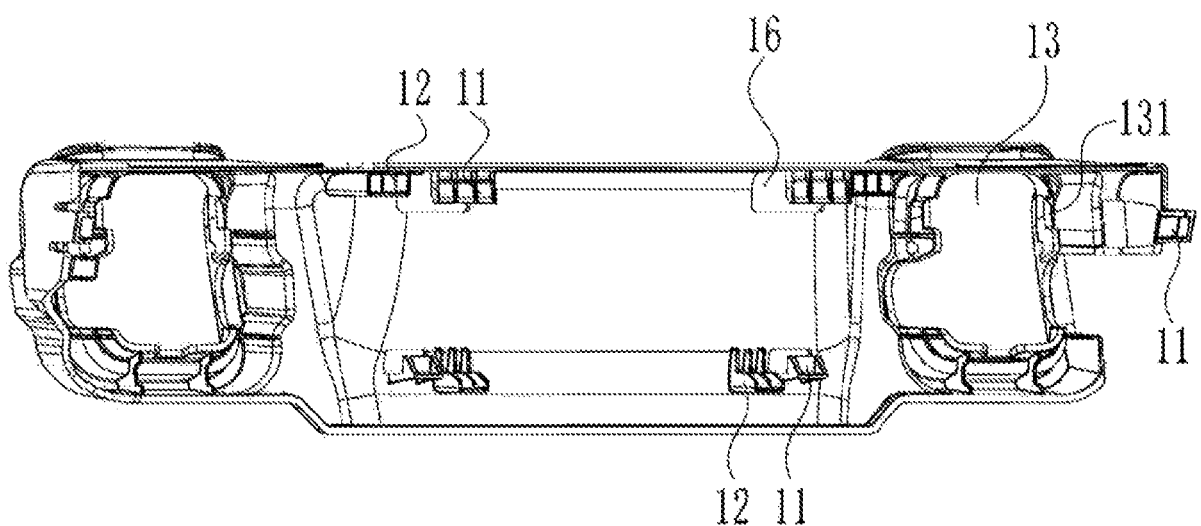
FIG. 6 is another perspective schematic view of the mount structure.
Figure 9:
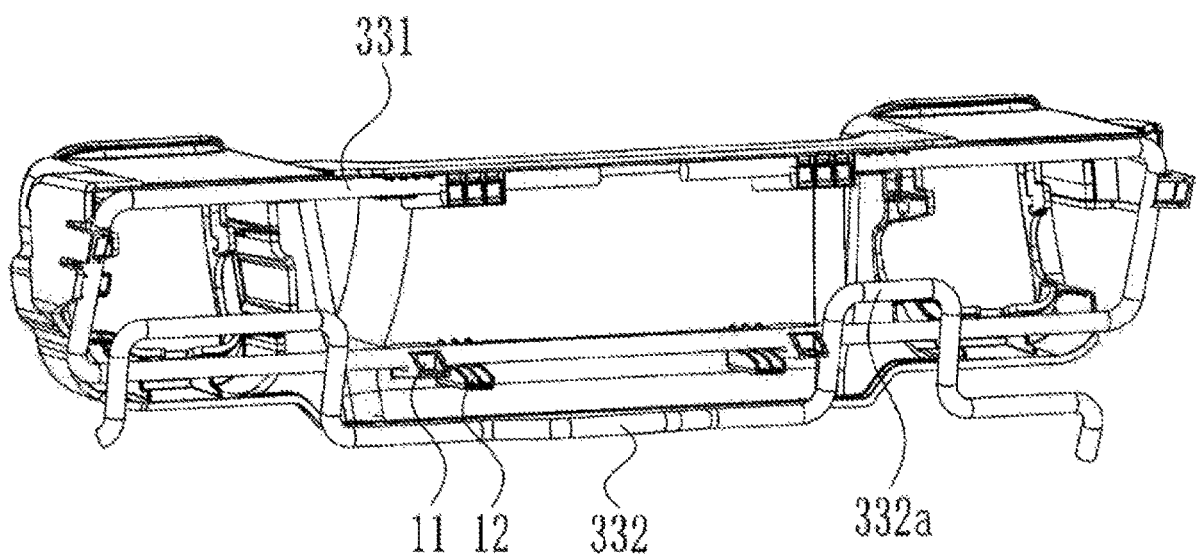
FIG. 9 is a cover mount with the seat frame and the schematic connection relationship between the two.

Referring to FIGS. 4, 6, and 9, the inner lid mount has a perimeter along an outer edge profile of the engaging structure 11, and the structure 11 for engaging the cover mount 133 is fixed on the seat frame. Further, the inner cover mount has at least one support seat cooperating with the engaging structure 112, the respective support seat disposed adjacent a respective engaging structure. The support base for supporting the seat frame 33 securely mounts the cover on the seat frame. The engagement structure facilitates mounting base 11 to the cover 1 and the seat frame 33, and the structure is simple and reliable, with high assembly efficiency.

Figure 8:
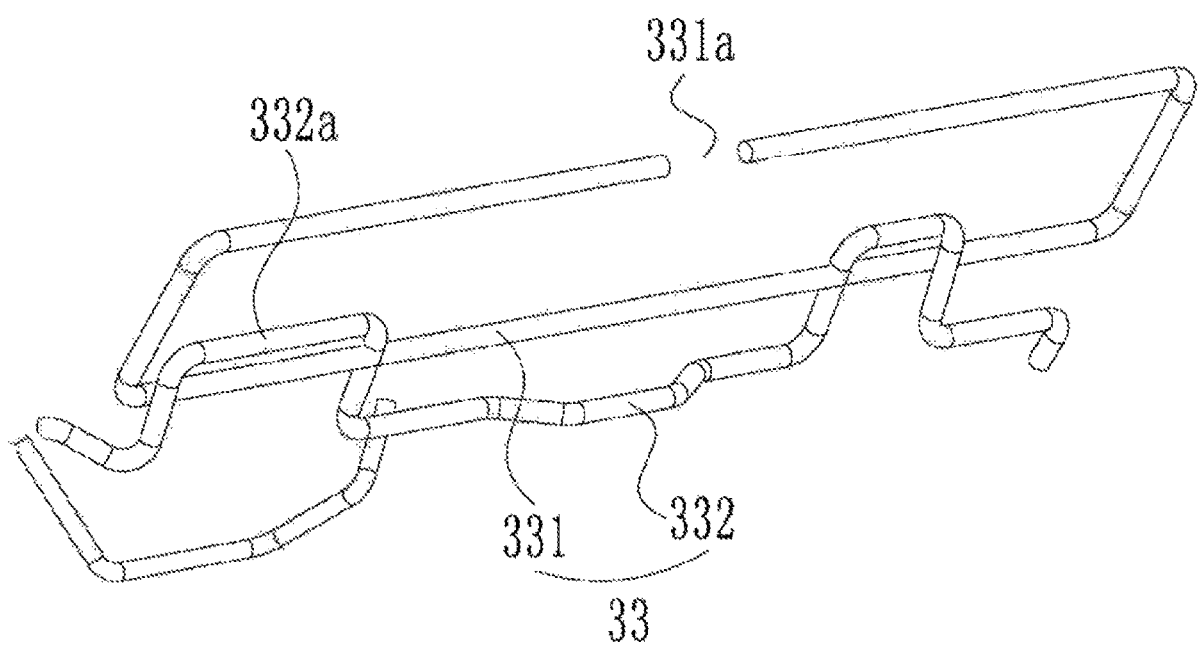
FIG. 8 is a partial schematic view of the seat frame utilized herein.

Referring to FIGS. 8 and 9, the seat frame 33 has a mounting portion 331 and a seat fixing portion 332 connected to the child safety seat. Said mounting seat cover 1 is fixed to the mounting seat fixing portion 331, the mount portion 331 is fixed to the respective engaging structure 11 of an annular configuration and adapted to mount to the cover, and has a notch 331 through which a certain amount of deformation is provided. The cap is connected to the mount portion 1 and the fixing mount 331 in the cover.

Referring to FIG. 9, the secure connection portion 332 at the rear of the seat mount fixing portion 331, when the cover is removed, is at least partially exposed and the connection portion 332 is installed in the corresponding hole 13. The safety seat has two connecting portions 332 with "n" shaped or "U" shaped bends 332a, 332a bent at the two ISOFIX mounting locations inside the corresponding opening 31.

Figure 7:
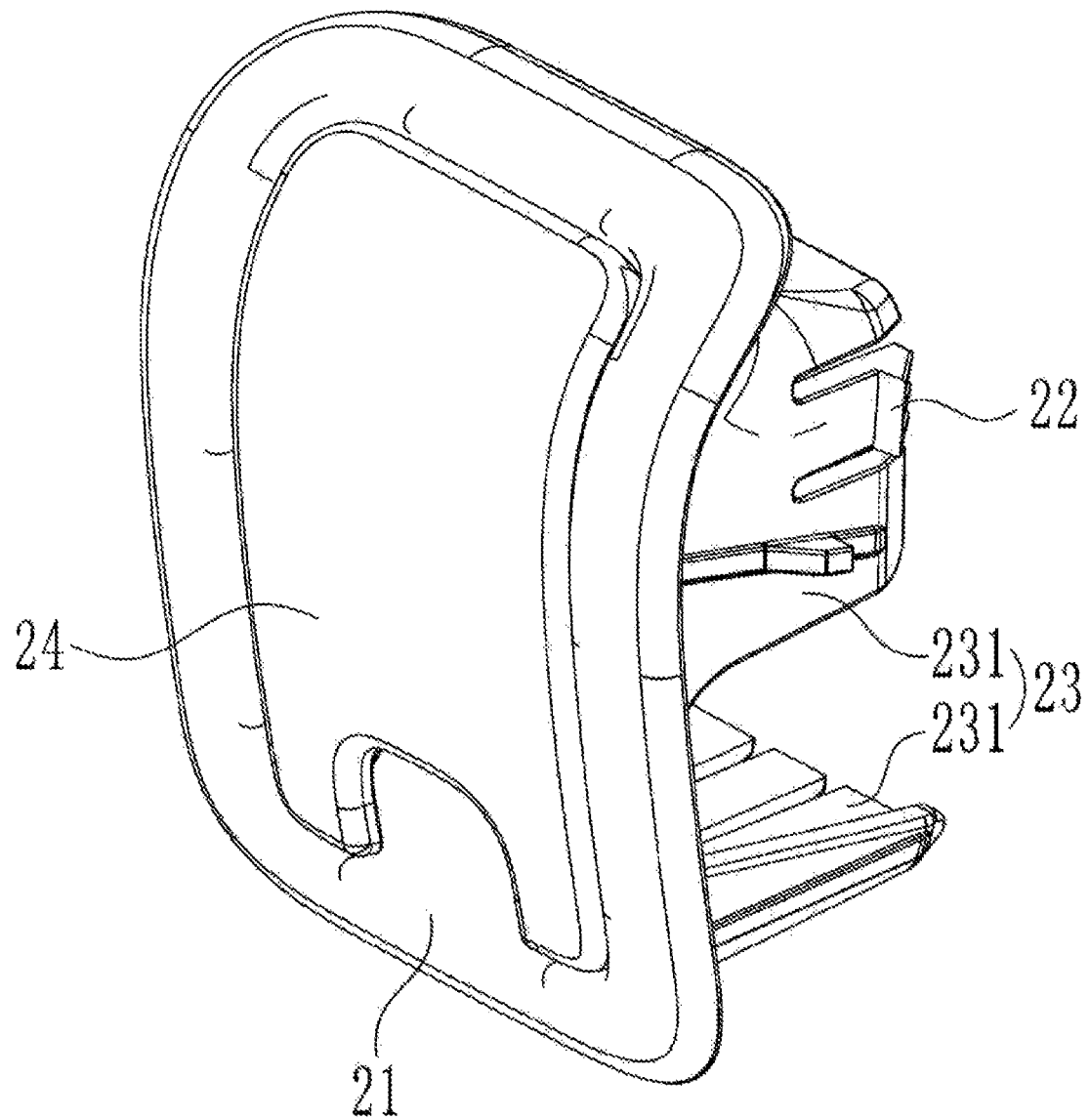
FIG. 7 is a schematic view of the cover of the ISOFIX interface structure.

Referring to FIGS. 3, 4, and 7, the ISOFIX cover 2 includes a panel portion 21 and the inner fitting portion 21 extends rearwardly from the panel portion 23. The panel portion 21 and the mounting table 132 are adapted to sink, and the insert portion 23 and the mounting holes 13 are adapted such that, when the cover is mounted on the base 1, the fitting 23 is inserted into the mounting hole 13 and the panel installation portion 21 is fitted in the sink 132 sets.

Referring to FIGS. 4 and 7, the insert portion 23 includes at least two support portions 231, where portions 231 are plate-like structures having elastic support and a gap between the adjacent support portions 231, so that ISOFIX cap 2 can be removably mounted on the cover mount 1. Further, each vehicle connector 22 is formed at the rear end of the fitting portion 23, i.e., each vehicle connector 22 is positioned corresponding to the rear end of the support portion 231 so as to mate with the respective bayonet connection 131, so that the cover is mounted on the mounting seat 1, and is easy to operate, low cost, with high connection reliability and long service life.

Referring to FIGS. 3 and 7, the outer side of the central panel portion 21 has an outwardly projecting reinforcement protrusion 24 to further improve the structural strength of the cover 2 and prolong the service life of the cover 2.

Referring to FIGS. 1 and 3, further, when the cover 2 is mounted in the mounting hole 13, the outer surface of the panel and the seat portion 21 against the outer surface is coincident with the connecting portion 32, and the end surfaces of the projecting portion 15 and the outer surface is a curved surface. This design improves the flatness of the surface of the seat, both to ensure the comfortable shape and safety.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following non-limiting claims for all purposes.

What is claimed is:

1. A vehicle seat ISOFIX interface structure, comprising: a mounting seat and two mounting covers, said mounting seat defining two longitudinal through-mounting holes and comprising a support connecting portion, said two mounting covers adapted to be inserted into the two through-mounting holes and detachably mounted on the mounting seat, wherein said mounting seat has two forwardly projecting portions corresponding to and surrounding said two through-mounting holes.

2. The ISOFIX interface structure according to claim 1, wherein said two forwardly projecting portions are located at end portions of said support connecting portion.

3. The ISOFIX interface structure according to claim 1, wherein each of said mounting covers has a front portion and rearwardly extending insert portion, the rearwardly extending insert portion adapted to engage the corresponding through-mounting hole.

4. The ISOFIX interface structure according to claim 3, wherein each rearwardly extending insert portion has a connector to engage the mounting seat within the corresponding through-mounting hole.

5. The ISOFIX interface structure according to claim 4, wherein each rearwardly extending insert portion has an elastic plate structure to engage the mounting seat within the corresponding through-mounting hole.

6. The ISOFIX interface structure according to claim 4, wherein each rearwardly extending insert portion has an outwardly extending engagement boss to engage the mounting seat within the corresponding through-mounting hole.

7. The ISOFIX interface structure according to claim 1, wherein each of said mounting covers has a cap engaging portion disposed around its periphery.

8. The ISOFIX interface structure according to claim 1, wherein each of said mounting covers has a cap engaging structure disposed therein.

9. The ISOFIX interface structure according to claim 1, further comprising a seat frame coupled to a back of the support connecting portion, wherein each of said two through-mounting holes provide access to the seat frame.

10. The ISOFIX interface structure according to claim 2, wherein said support connecting portion is configured to be covered with seat foam.

11. A vehicle seat, comprising:
a vehicle seat ISOFIX interface structure, comprising: a mounting seat and two mounting covers, said mounting seat defining two longitudinal through-mounting holes and comprising a support connecting portion, said two mounting covers adapted to be inserted into the two through-mounting holes and detachably mounted on the mounting seat, wherein said mounting seat has two forwardly projecting portions corresponding to and surrounding said two through-mounting holes.

12. The vehicle seat according to claim 11, wherein said two forwardly projecting portions are located at end portions of said support connecting portion.

13. The vehicle seat according to claim 11, wherein each of said mounting covers has a front portion and rearwardly extending insert portion, the rearwardly extending insert portion adapted to engage the corresponding through-mounting hole.

14. The vehicle seat according to claim 13, wherein each rearwardly extending insert portion has a connector to engage the mounting seat within the corresponding through-mounting hole.

15. The vehicle seat according to claim 14, wherein each rearwardly extending insert portion has an elastic plate structure to engage the mounting seat within the corresponding through-mounting hole.

16. The vehicle seat according to claim 14, wherein each rearwardly extending insert portion has an outwardly extending engagement boss to engage the mounting seat within the corresponding through-mounting hole.

17. The vehicle seat according to claim 11, wherein each of said mounting covers has a cap engaging portion disposed around its periphery.

18. The vehicle seat according to claim 11, wherein each of said mounting covers has a cap engaging structure disposed therein.

19. The vehicle seat according to claim 12, further comprising a seat frame coupled to a back of the support connecting portion of said ISOFIX interface structure, wherein each of said two through-mounting holes provide access to the seat frame.

20. The vehicle seat according to claim 12, wherein said support connecting portion is configured to be covered with seat foam.

* * * * *